F. R. GOOLMAN.
AUTOMATIC PIANO.
APPLICATION FILED JUNE 20, 1904. RENEWED JULY 5, 1906.

917,288.

Patented Apr. 6, 1909.
7 SHEETS—SHEET 1.

Fig. 1

WITNESSES:

INVENTOR
Frederick R. Goolman
BY
ATTORNEYS

UNITED STATES PATENT OFFICE.

FREDERICK ROOT GOOLMAN, OF BINGHAMTON, NEW YORK.

AUTOMATIC PIANO.

No. 917,288.  Specification of Letters Patent.  Patented April 6, 1909.

Application filed June 20, 1904, Serial No. 213,296. Renewed July 5, 1906. Serial No. 324,747.

*To all whom it may concern:*

Be it known that I, FREDERICK ROOT GOOLMAN, a citizen of the United States, and a resident of Binghamton, in the county of Broome and State of New York, have invented a new and Improved Automatic Piano, of which the following is a full, clear, and exact description.

The purpose of the invention is to provide a piano, and means electrically operated or operated by a coin, whereby to set the instrument in action, the instrument acting automatically to complete any tune commenced.

A further object of the invention is to provide a device attachable to any piano of any type, which will render the action of the piano automatic, and to accomplish the above-named results in a very simple, economic and practical manner.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
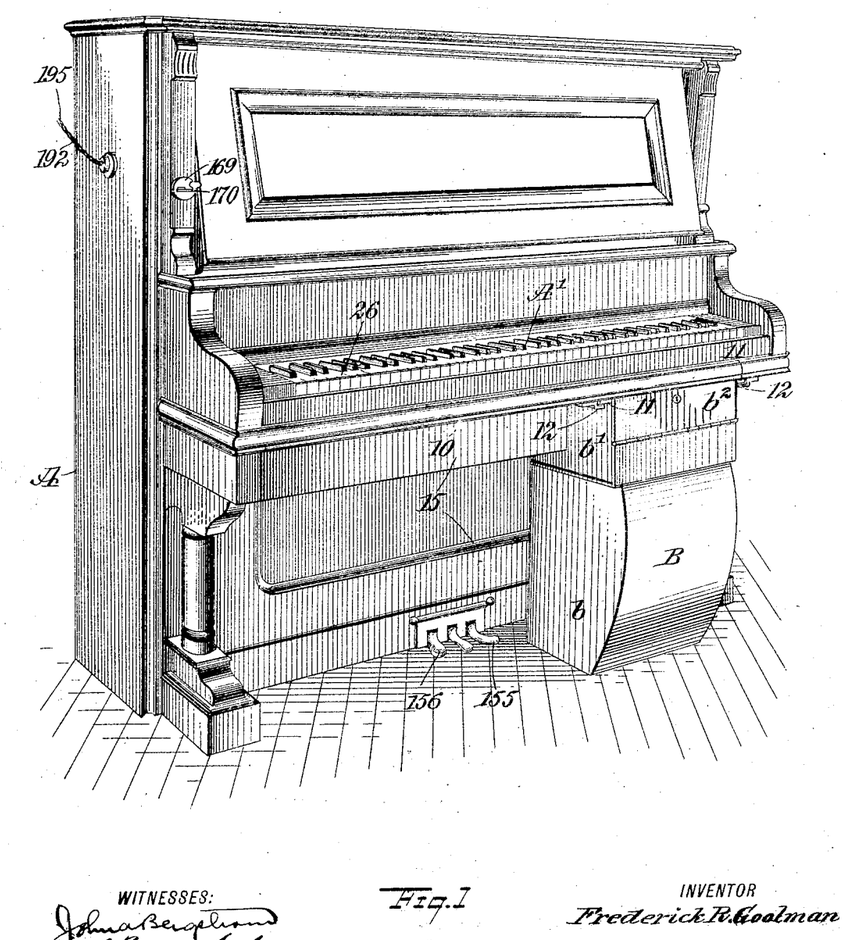
Figure 1 is a perspective view of a piano having the improved attachment applied.

In Fig. 1 I have illustrated a front perspective view of an upright piano A to which my improvement is applied, the said instrument being of the usual type, and B represents a drawer or receptacle located at the front below the horizontal partition 10 dividing the keyboard section from the lower portion of the casing of the instrument, the keyboard A' with its keys 26 being that of the usual type. In fact, the construction of the instrument throughout is that of the ordinary upright piano.

Figure 4:
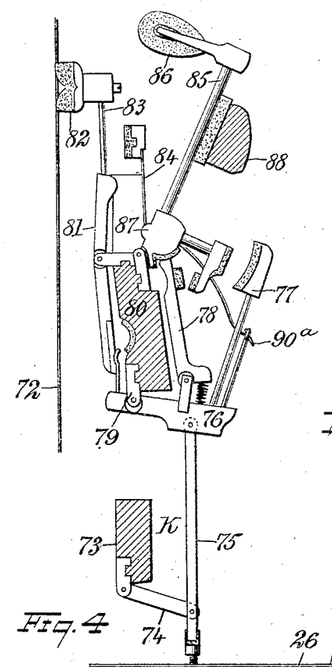
Fig. 4 is a transverse vertical section taken practically on the line 4—4 of Fig. 2.
Figure 8:
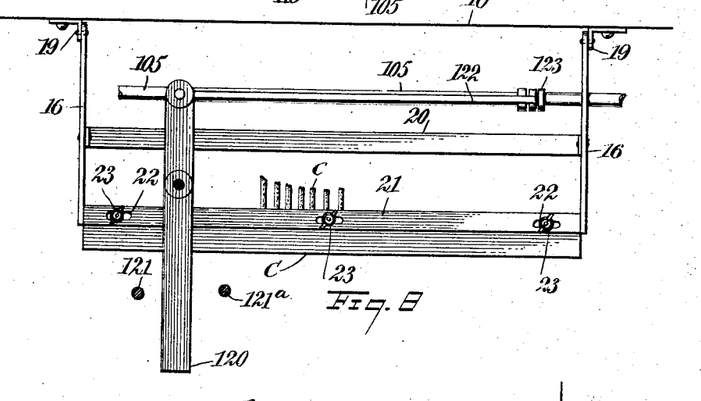
Fig. 8 is a plan view of the parts shown in Fig. 6, and appendages.

The drawer B is practically in two sections, namely, a main lower section $b$, adapted to receive the perforated paper after passing in contact with the duct bridge C to be hereinafter described, and an upper section $b'$, provided with an upper front preferably drop or hinged door $b^2$, as is shown in Fig. 1. The drawer B is removably attached to the instrument usually through slides 11 at the upper side portions of the drawer entering ways 12 secured to the under face of the said partition 10. Communication is established between the upper section $b'$ of the drawer B and the interior of the instrument A by means of an opening 13 in the back of the upper section of the drawer, and a registering opening $13^a$ in the lower front panel 15 of the instrument, as is shown in Fig. 4. The upper section $b'$ of the drawer B, receives a duct bridge C, the supports for the same and the tension device $B^2$ for the paper 14, together with the tempo or time-regulating device $B^3$; and the said upper section of the drawer carries the guide drums, hereinafter described, for the perforated paper 14, which guide drums are located below the duct bridge C when the drawer B is in position on the instrument. The duct bridge C is supported on side arms 16, pivoted at their rear ends to brackets 19, extending down from the partition 10, and braced by an intermediate bar 20, as is shown in Fig. 8; and as is also shown in Fig. 8, an outer top bar 21 is secured to the arms 16, having slots 22, screws 23 being passed through the slots into the top of the duct bridge C. Thus the duct bridge is endwise adjustable upon its supporting frame, so that its duct-ways or slots may be made to properly register with the slots or openings in the paper designed to cover or uncover the said duct-ways or slots in the duct bridge. That end of the supporting frame to which the duct bridge is attached is adjustably suspended by means of chains 24 or the like, attached to the frame and to the partition 10, as is shown in Fig. 4.

The duct bridge C is shown particularly in Figs. 4, 6, 8, 13 and 18. In the detail construction of the duct bridge, a series of duct openings or slots 25 is produced, corresponding in number to the number of keys 26 to be brought into operation on the keyboard A', and additional openings are also provided in the duct bridge, adapted to stop the automatic playing attachment when the end of the piece is reached. The duct openings 25 in the duct bridge C extend from the bottom edge 27, which is rounded, and out through the inner side edge, as is shown in Fig. 4; but in Fig. 18, which is purely a diagrammatic figure, while the duct bridge is clearly shown its true position is not disclosed, in order that the various connections may be made more apparent. The majority of the duct slots or openings 25 in the duct bridge C are connected by individual exciter tubes $c$ with pneumatics X, adapted to operate the keys, which pneumatics are arranged in two series, a lower series D and an upper series D'. The pneumatics X correspond in number to the number of keys desired to be brought into action, which keys will include all of the middle register, and as many octaves high and low as may be decided upon, but not necessarily the keys included in the extreme high or the extreme low octaves, but each key may be provided with a corresponding pneumatic if desired, which pneumatics are known as "striking pneumatics."

It has been found that much advantage has been obtained by arranging the striking pneumatics in the two rows D and D', one above the other, as thereby they are not crowded together, better results can be obtained and the entire arrangement of the attachment may be rendered exceedingly compact and accessible.

Figure 3:
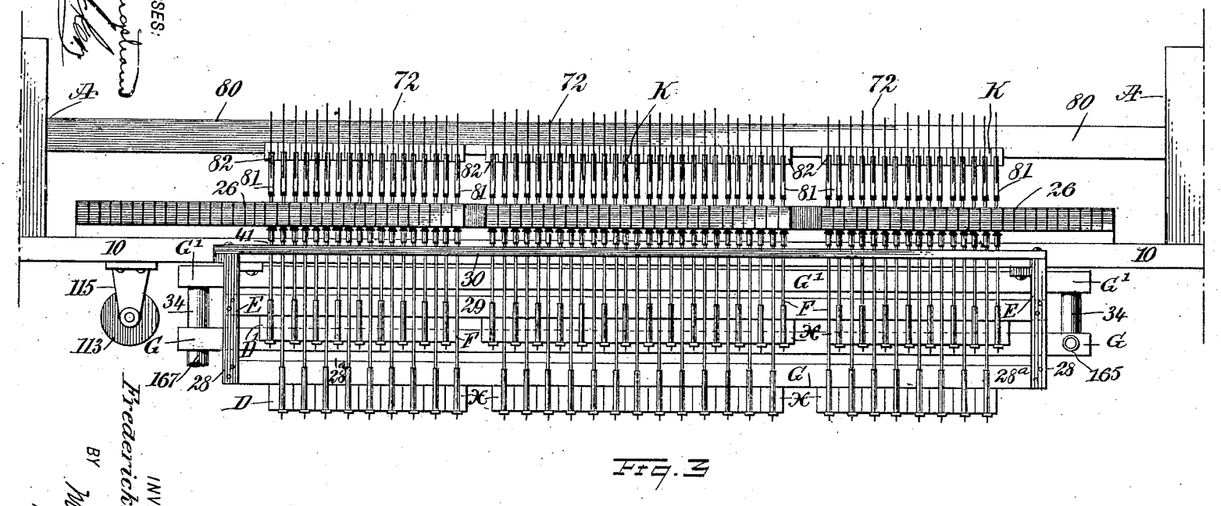
Fig. 3 is a rear view of the keys and the pneumatics, the said parts being removed from the casing.

As shown in Fig. 3 the striking pneumatics X are carried by a frame E, comprising side bars 28 secured to the rear portion of the partition 10, a bottom bar $28^a$ to which the lower row D of striking pneumatics are secured, an intermediate bar 29, which carries the upper row D' of striking pneumatics, and an upper tracker rail 30. The striking pneumatics X are all of the same construction and are so placed that the tracker rods F connected with the striking pneumatics of one row will not interfere with the action of the tracker rods of the other row of striking pneumatics.

Figures 11, 13:
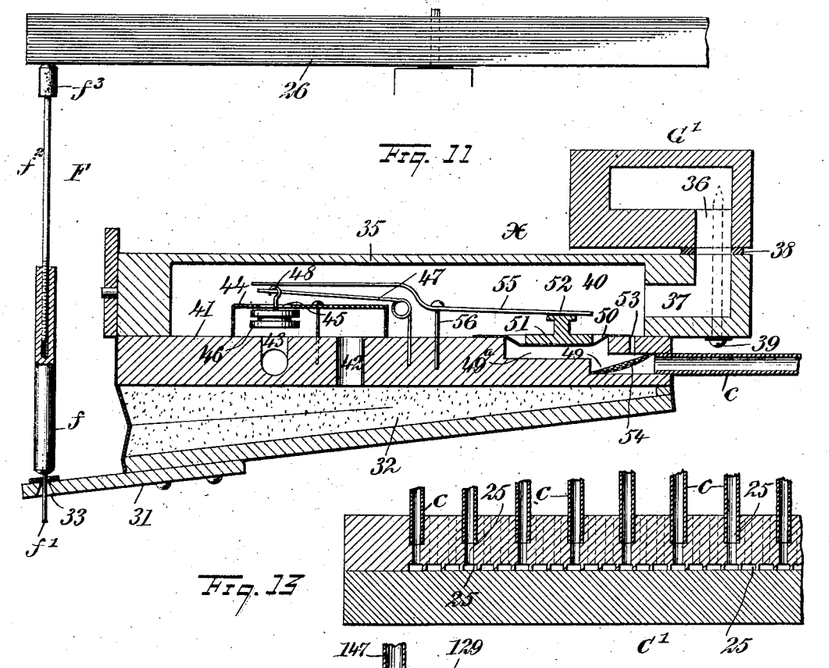
Fig. 11 is a longitudinal section taken through one of the pneumatics, and the parts operating directly therewith.
Fig. 13 is a cross section of the tracker board.

While the general arrangement of the tracker rods F is best shown in Fig. 3, an individual rod is best shown in Fig. 11. Each tracker rod F is operated by a rearwardly extending finger 31 from the lower or bellows section 32 of the striking pneumatic, and consists of a lower section $f$ having a pin $f'$ at its lower end, passing through an opening 33 in the rear of the finger, and an upper section $f^2$ screwed into the lower section $f$, so as to render the bar adjustable; and at the upper end of the section $f^2$ a striking head $f^3$ is provided, engaging with the under face of a key 26 at its inner end.

As I have arranged the striking pneumatics in two rows D and D', I also employ two vacuum chests G and G', connected near their ends by tubes or pipes 34. The vacuum chests G and G' are arranged above corresponding rows of striking pneumatics X, as is shown in Fig. 4, and each striking pneumatic of a row is in communication with an adjacent vacuum chest, the communication being clearly shown in Fig. 11. The vacuum chests G and G' are supported in the casing of the instrument below the partition 10 in any suitable or approved manner. The outer ends of the trunks or body portions 35 of the striking pneumatics X in the several rows D and D' are attached to corresponding vacuum chests G and G' by means of screws 39 or their equivalents, as is shown in Fig. 11; and each vacuum chest G and G' is provided with a number of openings 36 in its lower portion, and each of such openings 36 is in communication with the interior of the body or trunk of a striking pneumatic X by registering with an opening 37 at the outer attached end of the said striking pneumatics, and said openings 37 communicate with a vacuum chamber 40 in the body or trunk 35 of the striking pneumatics, which chamber is separated from the bellows 32 by a division board 41. Where the striking pneumatics X connect with the vacuum chests, washers 38 are employed to render the said connections air-tight, as is shown in Fig. 11.

Each striking pneumatic X is constructed as shown in Fig. 11, in which an exhaust port 42 is made in the partition 41, establishing communication between the vacuum chamber 40 and the bellows 32; and an air port 43, is made in the said partition 41, in communication with the atmosphere contained in the casing A of the piano and likewise in communication with the vacuum chamber 40. A cup 44 is located within the vacuum chamber 40, including within its span the exhaust port 42 and the air port 43, and over the air port an opening 45 is formed in the cup, adapted to be closed by a valve 46 located within the cup, being held thus seated by a spring 47 passed through an eye 48 extending from the valve through the opening 45 in the cup; but when the valve 46 is depressed against the tension of the spring 47, the valve will close the inner end of the air port 43, and these two movements of the valve, under the influence of the air in the vacuum chest, will effect the closure or the opening of the bellows section 32 of the striking pneumatic, and when the bellows 32 is closed the tracker rod F carried by that pneumatic will rise and operate the action, causing a hammer to strike a string; and when the bellows is inflated again the tracker rod will be drawn downward out of action.

At the inner end of each striking pneumatic, a longitudinal opening 49 is formed in the partition 41, into which opening an end of an exciter tube c is received, the other end of the tube being connected with a duct or opening in the duct bridge C; and an enlargement 49$^a$ is made in the opening 49 at its inner end, which enlargement of the opening extends out from the top of the partition 41, and is closed by a flexible diaphragm 50, which diaphragm 50 has a disk 51 secured to its upper face, which disk is consequently within the vacuum chamber 40; and the said disk is provided with a headed shank 52, extending centrally therefrom. A small port 53 is made in the partition 41, extending from its upper face into the opening 49 receiving the exciter tube c; and below this small port or duct 53 a screen 54 is located in said opening 49, which is a dust screen, and prevents any dust from passing into the opening 49 and clogging the duct 53, thereby preventing interference with the proper movement of the diaphragm 50.

The valve 46 is normally in the position shown in Fig. 11, namely, closing the opening 45 in the cup 44, at which time the bellows is inflated and the tracker rod F connected with the bellows is out of action. When, however, the valve 46 is carried down to a closed position over the air port 43, the vacuum will cause the bellows to collapse, and the valve 46 is carried down to this latter position by means of the air entering the openings 49 and 49$^a$ and raising the diaphragm 50, which in its turn will raise what I term a rider 55, which rider presses down upon the eye 48 of the valve 46, and forces the said valve downward against the tension of the spring 47. This rider 55 is in the form of a spring, one end having bearing against the valve 46 and the other end against the shank 52 of the disk carried by the diaphragm 50; and this spring is pivoted between its ends by means of a suitable pin 56, or its equivalent.

In the detail operation of this portion of the attachment the air is exhausted from the vacuum chest with which the striking pneumatic X is connected, which in turn exhausts air from the vacuum chamber 40 through the air duct 37. When the port 25 in the duct bridge C in communication with the striking pneumatic is opened by reason of a slot in the controlling sheet 14 registering with it, air is admitted through this duct in the duct bridge, and enters the openings 49 and 49$^a$ in the striking pneumatic, passing through the screen 54, and acts to raise the diaphragm 50, whereupon the end of the rider 55 bearing on the disk or button of the diaphragm 50 is raised and its opposite end depressed, unseating the valve 46 from the opening 45 in the cup 44, and causing it to close the air port 43, allowing the air to exhaust from the bellows 32 through the exhaust port 42, and the bellows to close and the track rod F of the pneumatic to have a striking action on the key 26. When the perforation or slot in the controlling sheet 14 has passed the duct in the duct bridge C, the in-coming air is cut off from the openings 49 and 49$^a$, leaving the space between the duct bridge and the diaphragm 50 full of dead air. The spring 47 then acts to raise the valve 46 so that it again seats itself against the cup 44 and again closes the opening 45 in the said cup, thus sealing the cup. At the same time that the spring 47 raises the valve 46 it likewise elevates the inner end of the rider 55, causing the outer end to depress the diaphragm 50, the dead air in the openings 49 and 49$^a$ finding an escape through the vent or port 53.

In order that the bellows 32 shall return to its original position, air must be admitted to it, so as to destroy the vacuum. Therefore the air port 43 is employed, and the atmospheric air entering this port passes up into the cup 44 and down into the bellows through the exhaust port 42.

Figure 2:
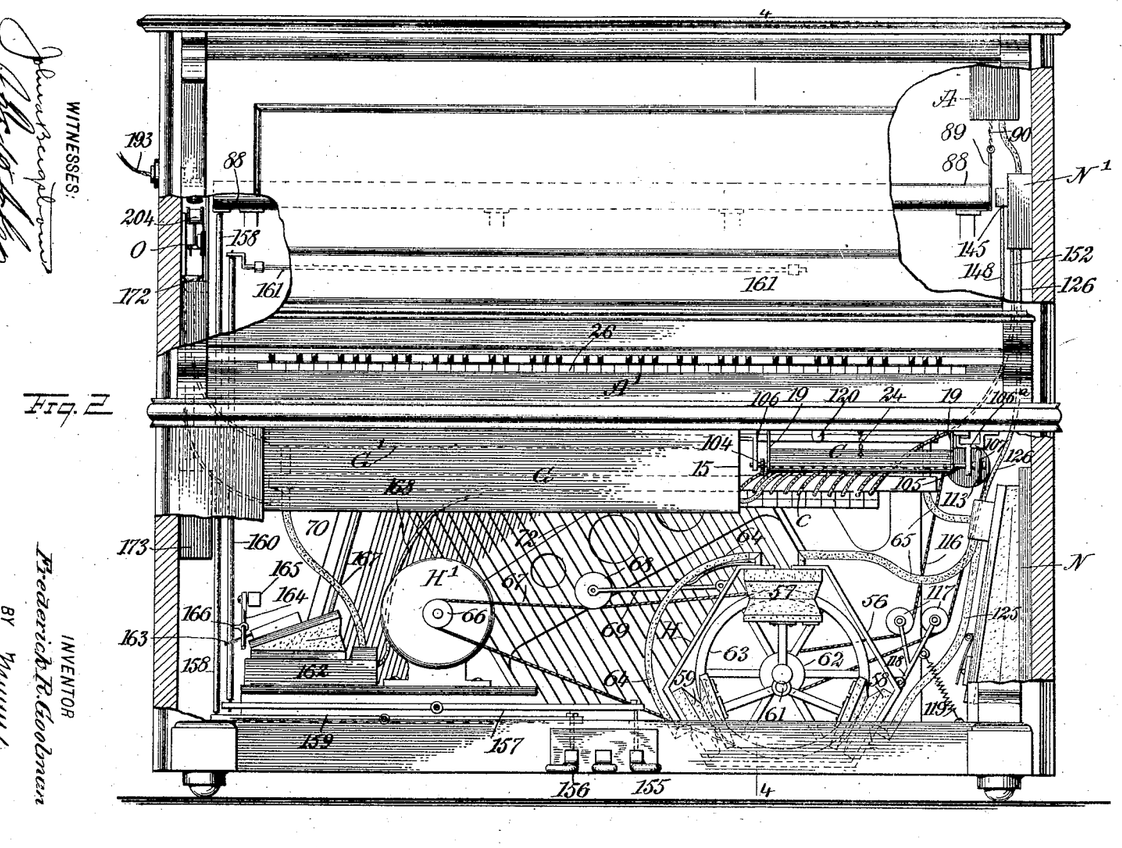
Fig. 2 is a front view of the instrument, a portion of the casing being removed and parts being in section.

Air is exhausted from the vacuum chests G and G' through the medium of a pump H, which consists of a substantially triangular fixed frame 56, provided with an upper bellows 57, and two other bellows 58 and 59 located at the side portions of the said frame at its bottom, all of these bellows being fixed to said frame. Each bellows is provided at its inner or operating face with a rod 60, and these rods 60 are pivotally connected with a crank pin 61, which crank pin is eccentrically mounted on a disk 62, carried by a shaft at the opposite end of which a large pulley 63 is secured. The pump, the shaft therefor and the pulley just described are located beneath the partition board 10 in the piano casing, somewhat near the front of the instrument and adjacent to the opening where the drawer B is located, as is best shown in Fig. 2. A tube 64 connects the lower bellows 59 with the upper bellows 57, and the upper bellows 57 is connected by a vacuum tube 65 with the vacuum chests G and G'.

A motor H', preferably an electric motor, is employed to drive the pulley 63 of the pump shaft, and this motor is provided with a suitable small driving pulley 66, over which a belt 67 is passed, the said belt being likewise passed over the large pulley 63 on the pump shaft; and preferably also a belt tightener is employed to engage with the upper stretch of the belt 67, consisting of a small friction pulley 68, shown in Fig. 2, mounted on an arm 69 which is pivoted on the pump frame 56. In Fig. 2 the sounding board is designated as 70 and the strings as 72.

The ordinary action K is employed for the keys 26, as shown in Fig. 4, and may be briefly described as follows: A rail 73 is employed, from which an arm 74 extends, pivotally connected with the abstract or prolong 75 with which the key engages, the said abstract or prolong being pivoted to a jack base 76. This jack base carries a back check 77 and a jack 78 together with a flange 79, which is connected with an action rail 80, and a lever 81 is pivotally attached to the said action rail, having a damper 82 for engagement with a string, and a shank 83 connecting the damper with the lever. The said support likewise carries the ordinary recover spring 84 and also the shank portion 85 of a hammer 86, the said shank of the hammer being provided with a butt 87, which is operated by the jack 78, and in the rear position of the hammer shank 85 it rests against a hammer rail 88. This hammer rail 88 is movable to and from the strings, being supported by arms 89 at its ends and chains 90 attached to said arms and to any overhead support in the casing.

With reference to the action shown in Fig. 4, I will here remark that the cord 90ª is that which is ordinarily known as the bridle tape.

The movable hammer rail 88 normally stands at such a distance from the strings as to give the hammers full play in making a stroke, but devices are employed, automatically controlled, to draw the hammer rail in direction of the strings so as to reduce the movement of the hammers and therefore reduce the volume of sound, producing the same effect as that which is accomplished by the action of the ordinary soft pedal of a piano. This device will be hereinafter particularly described.

Figure 5:
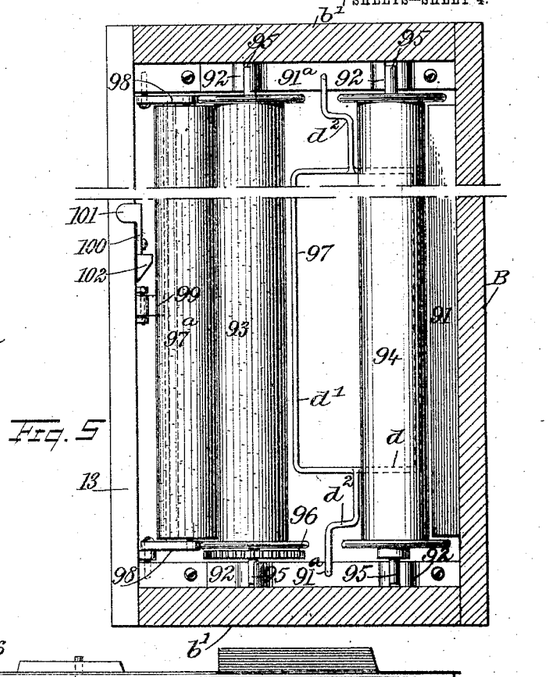
Fig. 5 is a horizontal section taken substantially on the line 5—5 of Fig. 4.

At the upper front portion of the section $b'$ of the box B, at the inner side of the said box, a batten 91 is located, and at each end of the box a bearing bar 91ª is secured, each of the bearing bars being provided with two open bearings 92, shown in Figs. 4 and 5. Corresponding bearings 92 are adapted to receive the trunnions 95 of two guide drums 93 and 94 for the controlling sheet 14, the outer roller 94 being so close to the batten 91 that only sufficient space is left between said roller and said batten to form an upper guide space for the controlling sheet 14, which is endless. The inner roller 93 is provided with a gear 96 at one end, which gear is located beyond the head of the said roller as is shown in Fig. 5, since each of the guide rollers or drums 93 and 94 is provided with end or head flanges. The controlling sheet 14 passes upward through the space between the batten 91 and the roller 94 over the said roller, and then over the roller 93 and down into the lower section $b$ of the drawer B.

It is evident that if the controlling sheet 14 were loosely passed over the two rollers or drums 93 and 94, there would be a great tendency for the sheet 14 to buckle and not to pass uniformly over said rollers, and consequently not pass uniformly beneath the duct bridge C, the lower portion of which duct bridge is engaged by that portion of the controlling sheet 14 which is between the two drums or rollers 93 and 94. In order to avoid such a difficulty I employ what I term a guide spider 97. This spider is usually made of wire bent upon itself so as to form a main loop section $d'$, which is parallel with and approaches somewhat closely the outer face of the inner roller or drum 93, as is shown in Figs. 4 and 5; and then the wire is bent upon itself in direction of the outer drum or roller 94, approaching it somewhat closely, and is then carried vertically downward and horizontally beneath the said drum or roller 94, forming members $d$, the outer ends of which effectually serve to prevent the controlling sheet passing beneath this roller 94 and becoming clogged or torn. Finally, arms $d^2$, also of wire, are attached to the sides of the loop section $d'$ in any suitable or approved manner, and these arms, which are sustaining arms, extend parallel with the inner face of the forward or initial roller or drum 94, and are then carried free from the heads of the said drum and are secured in the bearing bars 91ª in any approved manner. The loop section $d'$ of the spider 97 in its operation exerts extended, gentle and uniform pressure on the sheet 14, practically ironing it, and therefore absolutely prevents the sheet from buckling while passing over the rollers or drums 93 and 94.

In order that the controlling sheet 14 shall leave the inner roller 93 in a smooth condition, and furthermore to provide such frictional contact of the controlling sheet with the said roller 93 that it will be drawn regularly over the drum 93, a cramp roller 97ª, is employed, which engages with the said controlling sheet 14 just prior to its leaving the inner drum or roller 93. The cramp roller 97ª is mounted to turn in arms 98, which arms are pivotally attached to the rear portion of the drawer B in the section $b'$ thereof; and a spring 99 engages with a bar 99ª, which extends from one arm 98 to the other, the spring engaging with the central portion of the said bar 99ª. This spring is held up to its work by means of a latch 100, held to turn and to slide on the rear inner face of the drawer B, which latch is provided with a suitable thumb piece 101, extending above the bottom of the slot or opening 13 in the back of the said drawer as is shown in Figs. 4 and 5. The latch 100 is further provided with a head 102 having a beveled face. The said head, as the latch is turned and pushed toward the spring 99, will engage with the said spring, occupying a position between the spring and the inner rear face of the drawer as is shown in Fig. 4, thus compelling the spring 99 to keep the cramp roller 97ª up to its work. The cramp roller is prevented from moving too far in direction of the feed roller 93 with which it practically engages, by attaching chains 103 to the back portion of the drawer and to the arms 98 supporting the cramp roller.

Figures 6, 7:
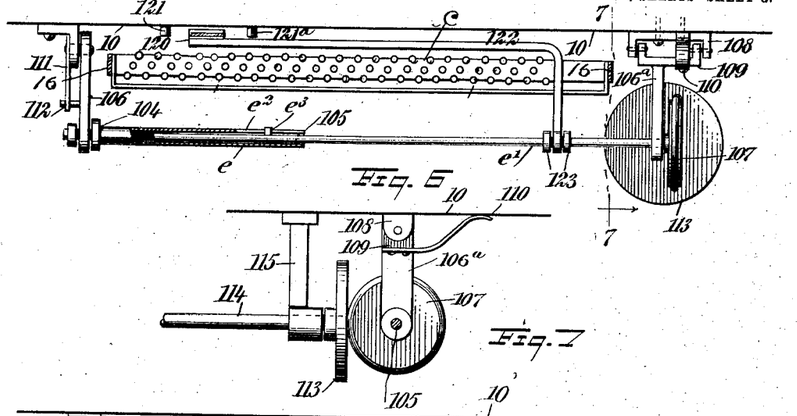
Fig. 6 is a vertical transverse sectional view taken practically on the line 6—6 of Fig. 4, certain parts being omitted.
Fig. 7 is a section taken substantially on the line 7—7 of Fig. 6.

The feed drums or rollers 93 and 94, or those which carry the controlling sheet 14, are operated through the medium of the said gear 96, which when operated upon moves the drum or roller 93, and it through the medium of the cramp lever 97ª, moves the said controlling sheet 14 over the other roller 94, which is in the nature of an idler. The movement of the roller or drum 93 is brought about and is regulated in the following manner: A pinion 104 engages with the gear 96, and this pinion is secured to a shaft 105, held to turn in bearings 106 and 106ª, supported from the partition 10 of the casing, as is shown in Figs. 6 and 7. The shaft 105, which extends parallel with the front of the instrument, is provided at one end, or the end opposite that carrying the pinion 104, with a friction wheel 107. The shaft 105, as is shown in Fig. 6, is a sectional shaft, or in other words, a telescopic shaft, comprising a tubular member $e$, which is held to turn in the bearing 106, and a solid member $e'$, journaled in the bearing 106ª, and to which the friction roller 107 is secured, the said solid section $e'$ of the shaft having sliding and guided movement in the tubular section $e$. To that end the tubular section $e$ is provided with a longitudinal slot $e^2$, and the entering solid section $e'$ of the shaft is provided with a lug $e^3$, which extends through and travels in the said slot $e^2$.

The two bearings 106 and 106ª, which are practically hangers, have pivotal supports on the partition 10 of the casing as is shown in Fig. 6. The pivotal bearing for the hangers 106ª is in the shape of an inverted U, as is shown at 108 in Figs. 6 and 7, and the said hanger 106ª is provided with a U-shaped head 109, pivotally attached at its members to the members of the bearing 108. A spring 110 is secured to the said head 109 and rests at its free end against the bottom of the said partition 10, forcing the friction roller 107 always in engagement with a disk 113 to be hereinafter referred to. The opposite hanger 106 is pivoted to an ordinary bracket attached to the partition 10, and a spring 111 secured to the said bracket, as is shown in Fig. 6, bears against the front side of a pin 112 on the hanger 106, causing the end of the shaft 105 to which the pinion 104 is secured to be normally forced in such direction as to assist the spring 110 in maintaining the friction roller 107 in engagement with the said disk 113.

The disk 113 and the shaft 105, together with the parts connected therewith, constitute what I term a tempo device, or a device for regulating the time, as it controls the speed of the controlling sheet 14 in its passage over the guide rollers 93 and 94, and such control is brought about by shifting the member $e'$ of the shaft 105 so as to bring the said friction roller 107 nearer the center of the disk 113, or nearer the periphery of the same. The disk 113 is mounted on the end of a shaft 114, journaled in suitable hangers 115 attached to the partition 10; and this shaft 114 is provided with a suitable pulley over which a belt 116 is passed, and this belt is likewise passed over a suitable pulley on the shaft of the pump H, as is indicated in Fig. 2. The belt 116 is held under tension and in suitable position to accomplish its work by means of idlers 117 engaging with both strands of the belt, the said idlers being carried by a forked arm 118 pivotally mounted on the frame 56 of the pump H, as is also shown in Fig. 2, and these idlers are held to their work by a spring 119 connected to the arm and to the base section of the casing of the instrument, as is also shown in Fig. 2.

The movement of the solid portion $e'$ of the tempo shaft 105 is brought about through the medium of a lever 120, which is commonly known as a metronome lever, and the said lever is pivoted to the bottom of the partition 10 and extends forward, terminating in a handle as is shown in Fig. 4, within easy reach when the drop section $b^2$ of the drawer B is lowered. This lever is limited in its movement by pins 121 and 121ª secured to the bottom of the partition 10 as is particularly shown in Fig. 6, and the inner end of the lever 120 is attached to a shifting arm 122, which shifting arm is mounted loosely on the solid section $e'$, of the shaft 105, between suitable collars 123.

It will be observed from the foregoing construction, that the lever forming the tempo construction B³ heretofore referred to, can be brought into action to cause the controlling sheet 14 to be moved more or less rapidly as the time of the music requires, by the simple manipulation of the metronome lever 120.

With reference to the device which controls the hammer rail and consequently controls the action of the hammers and renders the action of the hammers on the strings greater or less, I employ an equalizing bellows N which is in the lower portion of the casing, preferably located at one side, the right-hand side for example, and an upper expression bellows N', properly supported at the same portion of the casing. Between these two bellows N and N' a valve box M is located, specially used in connection with the expression bellows N'. All these parts mentioned are suitably supported. The expression bellows N' and the equalizing bellows N are plain bellows, but the equalizing bellows N, which is the lower one, and is adjacent to the pump H, is provided with a trunk 124. A tube 125 is connected with the bellows 58 in the frame of the pump H and with the trunk; while another tube 126 connects the trunk 124 of the equalizing bellows with the valve box M. Furthermore, the vacuum tube 65 which passes from the bellows 57 in the frame of the pump H likewise connects with the said trunk 124, and a continuation of the said pipe 65 connects with the lower vacuum chest G, that portion of the pipe 65 passing through the trunk 124, being divided in the said trunk.

Figure 12:
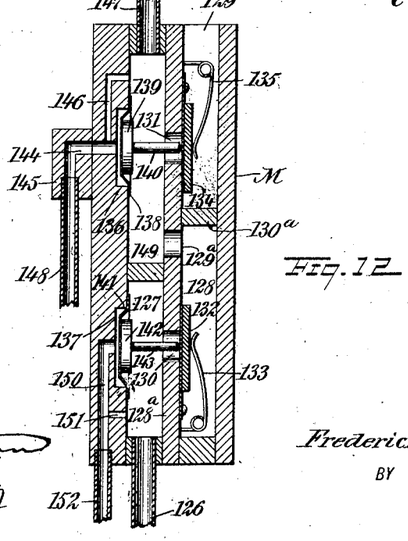
Fig. 12 is a vertical section through the sustaining device.
Figure 14:
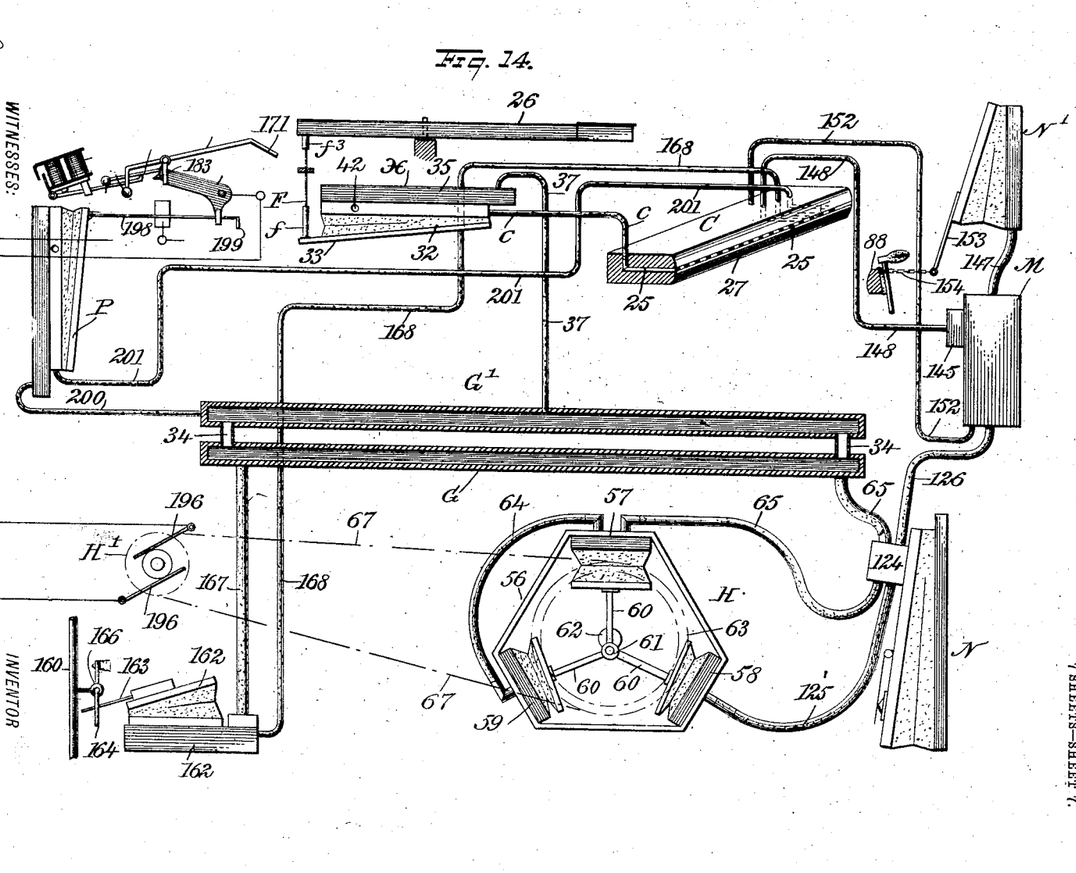
Fig. 14 is a diagrammatic view designed to illustrate the cardinal features in the operation of the attachment.

With reference to the detail construction of the valve box M, such construction is clearly shown in Fig. 12, wherein it will be observed that the box is provided with practically four chambers, namely divided chamber 127 and a parallel and divided chamber 128, the top 129 whereof is open and the bottom closed, the two chambers being separated one from the other by a partition 128ª. In the lower portion of the partition 128ª an opening 130 is produced, establishing communication between the two chambers 127 and 128; and at the upper portion of the said partition 128ª another and corresponding opening 131 is produced, establishing further communication. The lower opening 130 is normally closed by a flap valve 132, located in the chamber 128 and held in position by a spring 133, while the upper opening 131 in the said partition 128ª is normally closed by a flap valve 134, likewise located in the said chamber 128 and held in position by a spring 135. A partition 130ª divides the chamber 128 into two parts, the said partition 130ª being located below the upper flap valve 134 and above a communicating opening 129ª which is produced in the partition 128ª, and is uncovered at both sides. A recess 136 is produced in what may be termed the inner face of the outer wall of the chamber 127, and a recess 137 is correspondingly produced in the lower portion of the same wall of the said chamber 127. It may be here remarked that the tube 126 above alluded to as being carried from the trunk 124 of the equalizing bellows N enters the bottom portion of the said chamber 127. A diaphragm 138 covers the recess 136 at its inner portion, and this diaphragm, which is a flexible one, has attached to it a jumper 139, the stem 140 whereof extends into the opening 131 in the partition 128ª, and as the said jumper 139 is forced inward its stem 140 will engage with the flap valve 134 and unseat the same.

A diaphragm 141, likewise flexible, covers the inner portion of the lower recess 137 in the inner wall of the chamber 127, and this diaphragm 141 is attached to a jumper 142, the stem 143 of which passes into the opening 130 at the lower portion of the partition 128ª; and as this jumper 142 is forced inward it unseats the lower flap valve 132.

A trunk 145 is provided for the valve box M, opposite the upper jumper 139, and in this trunk a channel 144 is produced, which leads from the bottom portion of the said trunk and communicates with the recess covered by the upper diaphragm 138; and another channel or duct 146 connects with the said channel 144, being produced in the body of the valve box, and this latter channel 146 is in communication with the chamber 127 at a point above the jumper 139. A pipe or tube 147 connects the upper portion of the chamber 127 with the expression bellows N', and a tube 148 is carried from the channeled portion of the trunk 145 and the duct 146 to an opening in the duct bridge C, to be normally covered by the controlling sheet 14 passing over the said bridge, or uncovered when a suitable opening in the said controlling sheet registers with that in the duct bridge. The chamber 127 is divided at a point between the two jumpers 139 and 142 by means of a partition 149. A channel 150 is produced in the outer wall of the chamber 127 at its bottom portion, and this channel 150, by means of a duct 151 is in communication between its ends with the bottom compartment of the chamber 127, while the upper portion of said channel 150 is in communication with the lower recess 137 carrying the lower jumper 142 and its diaphragm, and a tube 152 connects with the bottom portion of the channel 150 and is carried to a connection with a port or duct in the duct bridge C. Thus the air admitted into the opening in the duct bridge C communicating with the said channel 150, when the said duct in the duct bridge is uncovered by an opening in the controlling sheet 14, will act upon the diaphragm 141 and will cause the said jumper in its turn to act on its flap diaphragm 132 to unseat the same.

The expression bellows N' is provided with a downwardly-extending finger 153, and this finger is connected by a chain 154, or the equivalent thereof, with the swinging or pivoted hammer rail 88, so that when the expression bellows N' is collapsed the hammer rail will be drawn in direction of the strings, and the hammers will have but a slight movement, and therefore the tone as a hammer strikes the strings will be soft; and as the expression bellows N' expands, the hammer rail 88 is carried away from the strings and the hammers will have greater action, and consequently when they strike the strings a louder tone will be produced.

In the operation of this form of the attachment, when the opening in the duct bridge C influencing the jumper 142 is uncovered by reason of an opening in the controlling sheet 14 registering therewith, the said valve 142 is forced inward and unseats the lower flap valve 132, permitting the air to be drawn from the expression bellows N', down through the tube 147, connecting it with the valve box M, the air entering the chamber 127 at the top and escaping through the opening 129ª in the said valve box; and the action of the air is such that the lower flap 132 in the valve box is sucked upon, and the air therefore enters the lower or vacuum section of the chamber 127. This action brings the piano hammers close to the strings, giving the piano a soft tone.

In order to make the piano play louder the expression bellows N' must open, permitting the hammers to have their full stroke. To accomplish this, the duct in the duct bridge C above referred to must be closed by the controlling sheet 14, and the duct in the duct bridge C corresponding to the upper jumper 139 must be opened, which action causes the upper flap valve 134 to open, thus permitting the air to rush in through the upper opening 129 at the top of the chamber 128, down through the valve opening 131 into the upper section of the chamber 127 and up through the tube 147 into the expression bellows N', expanding or opening the same, thus permitting the hammer rail to drop back to its normal position.

Figures 9, 10:
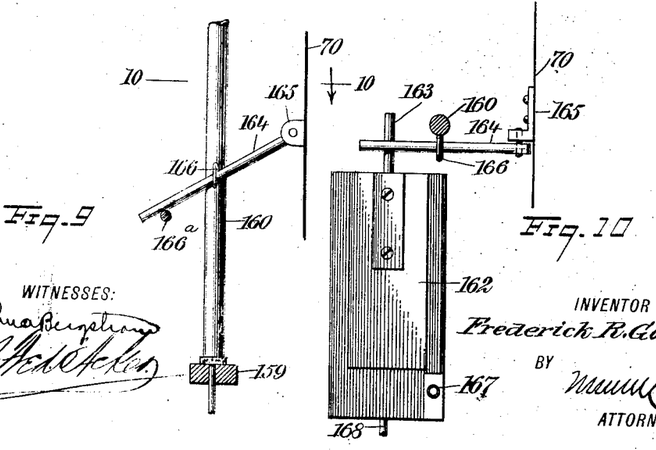
Fig. 9 is a detail view of a portion of the operating device for the lower sustaining bellows.
Fig. 10 is a section taken practically on the line 10—10 of Fig. 9, looking in the direction of the arrow.

In Fig. 2, 155 and 156 represent respectively the soft and the loud pedals respectively usually employed in connection with a piano, and 157 represents the pedal lever, which is connected with the soft pedal 155, which lever 157 supports a connecting rod 158, having the usual connection with the hammer rail 88. The loud pedal 156 is also provided with the usual pedal lever 159, and this lever supports a connecting or pedal rod 160, which extends upward to the usual connection with the ordinary damper rod 161, acting in the usual way, so that the instrument may be played upon the same as an ordinary instrument when the attachment is not brought into action; but the pedal rod 160 is automatically operated upon by means of what I term a sustaining bellows 162, and which is practically of the same construction as the pneumatics X heretofore referred to, the said sustaining bellows being provided with a finger 163, which engages with a lever 164, pivoted upon a bracket 165, extending from the sounding board 70, as is shown in Fig. 2, the said parts being shown in detail in Figs. 9 and 10. The lever 164 passes through an eye 166, or other form of guide, located on the pedal rod 160. The sustaining bellows 162 is connected with the lower vacuum box G by means of a suitable tube 167, and the said bellows 162 is connected by a tube 168 with a suitable duct in the duct bridge C, so that when the controlling sheet 14 presents an opening at the duct with which the pipe or tube 168 is connected, it brings the sustaining bellows 162 into action, and insures the loudest possible tone for a predetermined length of time. It may be here remarked, as is shown particularly in Fig. 9, that the lever 164 connected with the pedal bar 160 is limited in its downward movement by a stop 166ª.

In the front of one of the pilasters, preferably that at the left-hand side of the casing, a slotted wear plate 169 is secured, and in this plate a coin-conducting slide 170, shown in Fig. 1, has movement, the slide being so constructed as to conduct a coin placed thereon into the casing and deposit the coin on a tray 171, shown best in Fig. 18; and as the tray drops under the weight of the coin the coin slides off from said tray and enters a chute 172 shown in Fig. 2, and is conducted into a drawer 173, or other receptacle readily accessible or removable.

After a piece has been played to a finish, a slot in the controlling sheet 14 will be brought opposite a certain duct in the duct bridge C, in order that the circuit may be broken. This is accomplished through the medium of a pneumatic P, located within the casing, being of the same construction as the pneumatics heretofore described. At the upper end of the bellows portion of this pneumatic P a rod 198 is pivoted, and this rod passes through an eye 197 in the crank arm extension 187 from the pivoted portion of the knife-blade switch; and the end of the said rod 198, which is passed through the said eye 197, terminates in a crank arm 199, or an enlargement of any description. The pneumatic P is automatically controlled by the sheet to make and break an electric circuit of the motor and start or stop the mechanism in any well known manner. A vacuum tube 200 is connected with one section of the pneumatic P and with either one or the other of the vacuum chests G and G', and an exciting tube 201 is likewise connected with the pneumatic P and with the duct just referred to, located in the duct bridge. Therefore, when by the action of the controlling sheet 14 at the duct bridge air is withdrawn from the bellows in the pneumatic P, the collapsing of the bellows of said pneumatic will so pull on the rod 198 as to cause the breaking of the circuit and consequently causing the motor to cease action.

It will be noticed that the duct bridge is mounted upon a swinging frame. The reason for such mounting is that it permits the drawer B to be pushed in easily, the duct bridge rising so as to allow the spools or drums 93 and 94 to pass under.

If the controller sheet 14 should become cramped or pull too hard, the duct bridge will rise, relieving pressure between the two spools or drums 93 and 94, allowing the sheet to pass more evenly and freely over the drums. This action prevents the sheet 14 from pulling from one side to the other, thus maintaining the controller sheet 14 in good order.

With reference to the particular action of the sustaining pneumatic or bellows 162, while this bellows works the piano dampers are drawn away from the strings, sustaining the tones brought about by the striking of the hammers.

Having thus described my invention, I claim as new, and desire to secure by Letters Patent,—

1. A striking pneumatic for automatic instruments, comprising a body section having a vacuum chamber provided with an end outlet, a bellows below the body, a partition between the bellows and the body, being provided with a communicating opening and an opening to the atmosphere together with an end opening adapted for communication with the duct bridge of the instrument, an apertured cup over the communicating atmospheric opening, a valve held to play in the said cup to and from the opening in the cup and the atmospheric opening, and means for operating the said valve through the conditions of the air at the end opening in the partition, as described.

2. A striking pneumatic for automatic instruments, comprising a body portion having a vacuum chamber therein, provided with an end outlet adapted for communication with the vacuum chest of the instrument, and a bellows below the body section, the partition separating the two parts having a communicating opening, an opening to the atmosphere and an end opening in communication with the duct bridge of the instrument, a dust sieve in the said end opening, a valve controlling the opening to the atmosphere, and means for controlling the said valve from the end opening in the partition, as described.

3. In striking pneumatics for automatic instruments, a body portion having a vacuum chamber therein provided with an end outlet, adapted for communication with the vacuum chest, a bellows below the said chamber, provided with a finger, a tracker rod carried by said finger, the partition dividing the two sections of the striking pneumatic being provided with a communicating opening and an opening in communication with the atmosphere extending up through the top of the partition, the said partition being also provided with an end opening adapted for communication with the duct bridge of the instrument, and a channel from the said opening leading into the vacuum chamber, a cup located over the communicating opening and the opening in communication with the atmosphere, which cup is provided with an opening communicating with the vacuum chamber, a valve having play to and from the opening in the cup and the opening in communication with the atmosphere, to alternately close one or the other of said openings, a diaphragm closing the upper portion of the end opening in the partition of the said pneumatic, and means for controlling the said valve from the said diaphragm, as described.

4. In striking pneumatics for automatic instruments, a body portion having a vacuum chamber therein provided with an end outlet, adapted for communication with the vacuum chest, a bellows below the said chamber, provided with a finger, a tracker bar carried by the said finger, the partition dividing the two sections of the striking pneumatic being provided with a communicating opening and an opening in communication with the atmosphere extending up through the top of the partition, the said partition being also provided with an end opening adapted for communication with the duct bridge of the instrument and a channel from the said opening leading into the vacuum chamber, a cup located over the communicating opening and the opening in communication with the atmosphere, which cup is provided with an opening communicating with the vacuum chamber, a valve having play to and from the opening in the cup and the opening in communication with the atmosphere to alternately close one or the other, a diaphragm closing the upper portion of the end opening in the partition of the said pneumatic, a dust sieve located at the outer end portion of the end opening in said partition, a spring serving to normally hold the said valve in an upper position, and a device for forcing the valve downward at the upward movement of the said diaphragm, as described.

5. In striking pneumatics for automatic instruments, a body portion provided with a vacuum chamber having an opening at one end, adapted for communication with the vacuum chest, a bellows located below the vacuum chamber, having a finger adapted to support a tracker bar, partition between the bellows and vacuum chamber provided with a communicating opening and an opening in communication with the atmosphere leading out through the upper portion of the partition, the said partition being likewise provided with an end opening, an air duct connecting the said opening with the vacuum chamber, a diaphragm otherwise closing the said end opening with relation to the vacuum chamber, a projection from the diaphragm, a cup located on the partition, covering the communicating opening and the opening in communication with the atmosphere, which cup is provided with an opening communicating with the vacuum chamber, located over the opening in communication with the atmosphere, a spring controlled valve mounted within the cup, adapted to alternately close the opening in the cup and the opening communicating with the atmosphere, and a rider having bearing on the said valve, pivoted on the partition between its ends, one end of which rider rests upon the projection from the said diaphragm, as described.

6. In striking pneumatics for automatic instruments, a body portion provided with a vacuum chamber having an opening at one end, adapted for communication with the vacuum chest, a bellows located below the vacuum chamber, having a finger adapted to support a tracker bar, the partition between the bellows and vacuum chamber being provided with a communicating opening and an opening in communication with the atmosphere leading out through the upper portion of the partition, the said partition being likewise provided with an end opening, an air duct connecting the said opening with the vacuum chamber, a diaphragm otherwise closing the said end opening with relation to the vacuum chamber, a projection from the diaphragm, a cup located on the partition, covering the communicating opening and the opening in communication with the atmosphere, which cup is provided with an opening communicating with the vacuum chamber, located over the opening in communication with the atmosphere, a spring-controlled valve mounted within the cup, adapted to alternately close the opening in the cup and the opening communicating with the atmosphere, a rider having bearing on the said valve, pivoted on the partition between its ends, one end of which rider rests upon the projection from the said diaphragm, a dust sieve located at the end portion of the end opening in the partition, a duct bridge, and a communication between the end opening in the partition and the said duct bridge, for the purposes set forth.

7. In striking pneumatics for automatic instruments, a duct bridge, a pneumatic, an exciter tube connecting the pneumatic with the duct bridge, said striking pneumatic being provided with a stepped chamber into which the exciter tube is entered, which chamber is in a measure covered by a flexible diaphragm and is provided with a port independent of the diaphragm, a valve located at the air port of the pneumatic, a connection between the diaphragm and valve, and a dust sieve located diagonally in said chamber where the exciter tube enters and between said tube, the diaphragm and the port.

8. In striking pneumatics for automatic instruments a body portion having a vacuum chamber therein, provided with an end outlet, a vacuum chest in communication with the said outlet, a bellows below the said chamber, a partition dividing the two sections of the striking pneumatic and provided with an opening in communication with the atmosphere, the said partition being also provided with an end opening adapted for communication with the duct bridge of the instrument, and a channel from the said opening leading into the vacuum chamber of the pneumatic, a cup located over the end opening and the opening in communication with the atmosphere in the said partition, which cup is provided with an opening communicating with the vacuum chamber of the pneumatic, a valve having play to and from the opening in the cup and the opening in communication with the atmosphere, to automatically close one or the other of said openings, a diaphragm closing the upper portion of the end opening in the partition of the pneumatic, and means for controlling the said valve from the said diaphragm.

9. In an automatic piano, a damper rod, a pedal lever, a connecting rod extending from the damper rod to the pedal lever, the said connecting rod having an eye formed thereon, a lever fulcrumed on a fixed support passed through the eyes of the said connecting rod, a stop for the said lever, a duct bridge, a vacuum chest constructed in two parallel compartments, one located above the other, said compartments of the vacuum chest being connected at their ends, a pump for creating a vacuum in the said chest, a sustaining pedal bellows provided with a finger adapted to engage with the said lever, a communication between the said pedal sustaining bellows and the vacuum chest, and a second communication between the pedal sustaining bellows and the duct bridge, all operating as described.

10. In automatic pianos, a casing containing tone-producing elements, a swing duct bridge within the instrument, a drawer removable from the instrument, and drums or reels for carrying the controlling sheet for the instrument, located within the said drawer, which drums or reels when the drawer is connected with the instrument are beneath the duct bridge, and a controlling device for a controlling sheet when placed on the drums or reels, as described.

11. In automatic pianos, a casing containing tone-producing elements, a swinging duct bridge within the instrument, a drawer removable from the instrument, drums or reels for carrying the controlling sheet for the instrument and mounted to revolve within the drawer, which drums or reels when the drawer is in place are below the duct bridge, and a guiding spider located between the drums or reels, as described.

12. In a pneumatic, the combination of a body having a vacuum chamber provided with an outlet, an auxiliary chamber adapted for connection with a duct bridge, and an air port in communication with the atmosphere; a bellows having an exhaust port in communication with the vacuum chamber; an apertured cup in the vacuum chamber, located over the air port and the outlet of the bellows exhaust port; a valve in the cup, adapted to play between the aperture in the latter and air port; and means for operating the said valve, dependent for actuation upon the condition of the air in the auxiliary chamber; as set forth.

13. In a pneumatic, the combination of a chambered body having an outlet, and a bellows, having between them a common wall provided with an air port in communication with the atmosphere and opening into the chamber, an exhaust port for the bellows, and an auxiliary chamber adapted for connection with a duct bridge; an apertured cup within the chamber, located over the air port and the bellows exhaust port; a valve in the cup, adapted to play between the aperture in the cup and the exhaust port; and means for operating the said valve, dependent for actuation upon the condition of the air in the auxiliary chamber; as set forth.

14. In a pneumatic, the combination of a body having a vacuum chamber provided with an outlet, an auxiliary chamber adapted for connection with a duct bridge, and an air port in communication with the atmosphere; a bellows having an exhaust port into the vacuum chamber; an apertured cup in the vacuum chamber, located over the air port and the bellows exhaust port; a valve within the cup, yieldingly held to close the aperture in the cup; a lever for carrying the valve away from the said aperture and upon the air port to close the latter; and means for actuating the lever, dependent for operation upon the condition of the air in the auxiliary chamber; as set forth.

In testimony whereof I have signed my name to this specification in the presence of two subscribing witnesses.

FRED. ROOT GOOLMAN.

Witnesses:
T. H. MUTTER,
LA VERNE RACE.